April 24, 1962   H. H. STRAUSS   3,031,277
FIRE KINDLING DEVICE
Filed Sept. 26, 1957   3 Sheets-Sheet 1

INVENTOR
HERMAN H. STRAUSS
BY *William F. Pye*
ATTORNEY

April 24, 1962   H. H. STRAUSS   3,031,277
FIRE KINDLING DEVICE
Filed Sept. 26, 1957   3 Sheets-Sheet 2
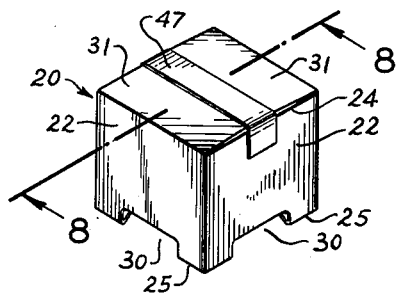
FIG. 7.
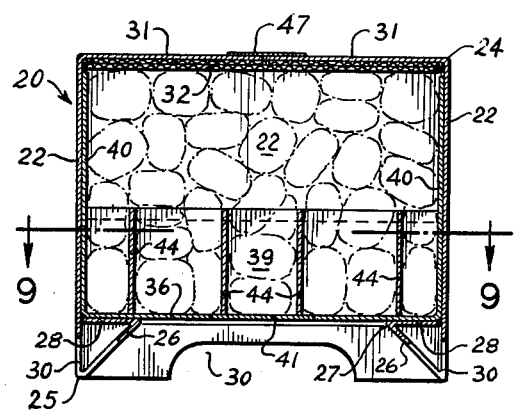
FIG. 8.
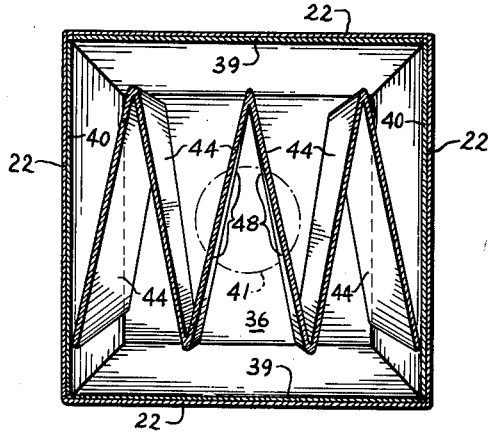
FIG. 9.
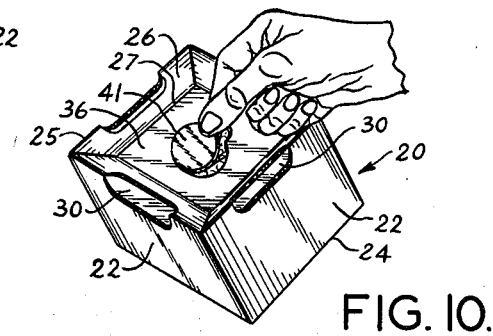
FIG. 10.
FIG. 11.
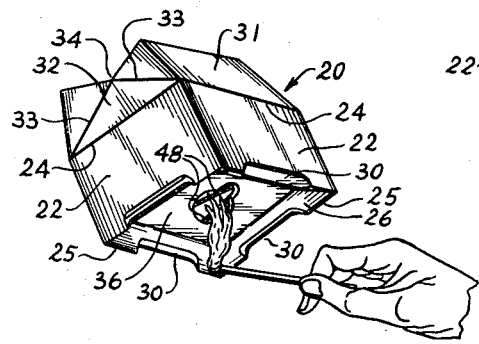
FIG. 12.
INVENTOR
HERMAN H. STRAUSS
BY
*William Frye*
ATTORNEY

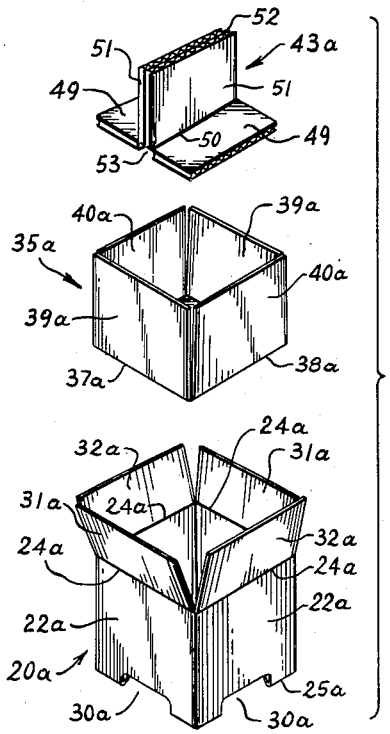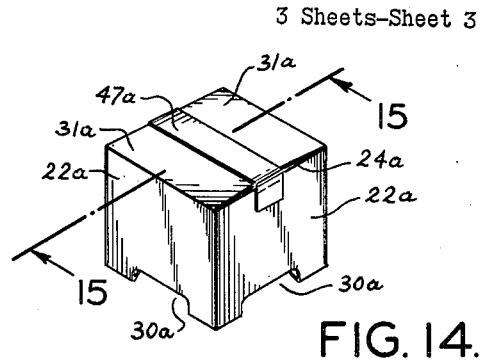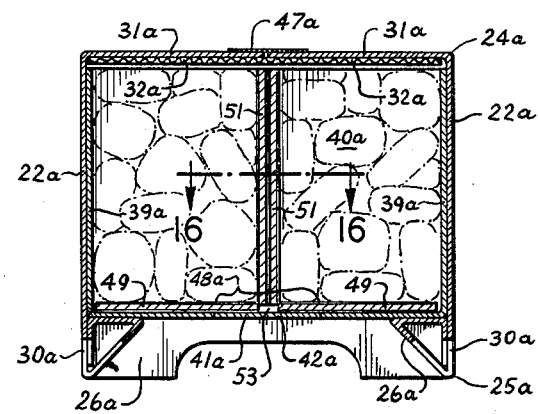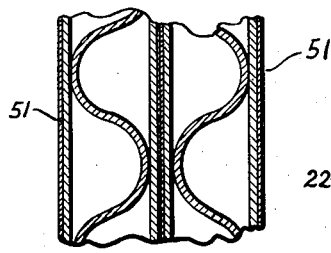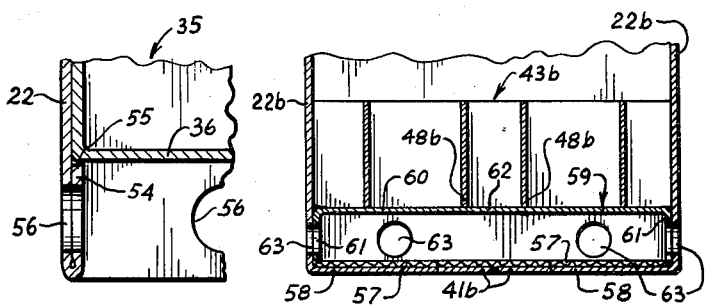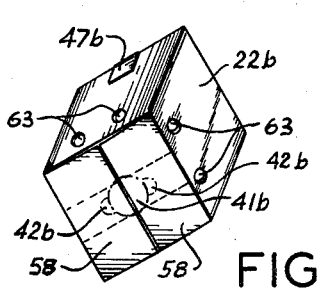

United States Patent Office 3,031,277
Patented Apr. 24, 1962

3,031,277
FIRE KINDLING DEVICE
Herman H. Strauss, St. Louis, Mo., assignor to Crown Zellerbach Corporation, San Francisco, Calif., a corporation of Nevada
Filed Sept. 26, 1957, Ser. No. 686,408
3 Claims. (Cl. 44—40)

This invention appertains to a fire kindling device and in particular to a kindling device in the form of a container of solid fiberboard, corrugated fiberboard, or any other suitable material.

Igniting charcoal, coal, wood or other solid or similar fuels requires considerable skill. Quite often extrinsic kindling materials are required to ignite the fuel, materials such as wood shavings, paper, or inflammable substances. The kindling materials mentioned are not always readily available, or in some instances impart an undesirable taste or odor to the fuel, which is transferred to foods being cooked.

Also fuels of the type described are most effectively kindled and ignited when held in a compact mass about the heat source. It is often quite difficult and requires considerable skill to maintain a fuel in a compact mass to facilitate ignition.

Previous and varied attempts have been made to provide means by which fuels such as charcoal and the like may be ignited, however, each attempt has had one or more disadvantages. For example, many packages employed for kindling fuel have not been of material which is completely consumed by combustion, thereby providing residual ashes which interfere and contaminate the bed of coals.

Also, when extrinsic igniting materials are employed with packages containing these substances sometimes they accidentally ignite prior to the time the fuel is to be kindled, creating a shipping or storing hazard.

Also many previous devices provide ventilating openings adjacent the contents which permit sifting of the fuel during the shipment or storage. Other prior devices do not maintain the fuel in a compact mass until the fuel is uniformly ignited. It is therefore a primary object of this invention to provide a fire kindling device which eliminates the disadvantages set forth above, and which is inexpensive and readily manufactured.

The invention is embodied in a package containing fuel and having an upright flue device disposed within the package adjacent the fuel, an openable closure means to provde communication between the atmosphere and the flue device, and an openable closure means at the top of the package to provide communication between the fuel and the atmosphere, the package being formed of combustible materials.

The invention also consists in the parts, arrangements and combinations of parts hereinafter described and claimed. The accompanying drawings form a part of this specification and like numerals and symbols therein appearing refer to like parts wherever they occur.

FIG. 7 is a perspective view of a completely assembled, sealed container embodying a preferred form of the invention;

FIG. 8 is a vertical sectional view along lines 8—8 of FIG. 7;

FIG. 9 is a horizontal view taken along lines 9—9 of FIG. 8;

FIG. 10 is a perspective view of the under side of a package embodying the invention illustrating the removal of the bottom, igniting closure means;

FIG. 11 is a perspective view of an embodiment of the invention illustrating the removal of the top closure sealing means;

FIG. 12 is a perspective view of an embodiment of the invention as the underside of the container is being ignited;

FIG. 13 is an exploded perspective view of another package embodying a modified form of the invention;

FIG. 14 is a perspective view of the embodiment of the invention shown in FIG. 13;

FIG. 15 is a vertical sectional view along lines 15—15 of FIG. 14;

FIG. 16 is a horizontal fragmentary sectional view along lines 16—16 of FIG. 15;

FIG. 17 is a fragmentary vertical sectional view of a still further embodiment of the invention illustrating the underside portion of a container;

FIG. 18 is a perspective view of the bottom of a container embodying another modified form of the invention; and FIG. 19 is a vertical sectional view of the embodiment shown in FIG. 18 illustrating the bottom container structure.

Figure 1:
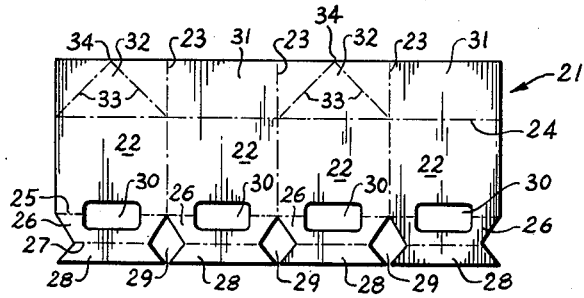
FIG. 1 is a plan view of a blank embodying a preferred form of a container comprising the invention.

In the embodiment of the invention shown in FIGS. 1 through 12 inclusive, an exterior container 20 is formed from a generally rectangular container blank 21 having 4 upstanding side panels 22 defined in part by corner fold lines 23, a top fold line 24, and a bottom fold line 25. The bottom structure of the container blank 21 is formed as set forth and disclosed in U.S. Patent No. 2,603,401, issued on July 15, 1952, to Herman H. Strauss. The bottom structure utilizes an inner marginal panel 26 connected to the side panels 22 along the bottom fold line 25, and having an outer margin defined by a horizontal score line 27. An intermediate panel 28 is foldably connected to the inner marginal panel 26 along the horizontal score line 27. Intermediate each adjacent pair of inner marginal panels 26 and intermediate panels 28, a V notch cut out 29 is provided. The V notch is sized as completely set forth in Patent No. 2,603,401.

An air access opening 30 is provided along the bottom fold line 25 and extends into the side panels 22 and the inner marginal panel 26.

The top closure of the embodiment described is defined in part by extensions of the corner fold lines 23 which border two substantially rectangular outer top panels 31 and two inner top panels 32. The inner top panels are provided with diagonal score lines 33, as best shown in FIG. 1, which extend from the juncture of the extension of the corner fold lines 23 and the top fold lines 24 to a central portion 34 of the outer edge of the inner top panels 32. The diagonal score lines 33 facilitate the formation of the top closure means for the container.

Figure 2:
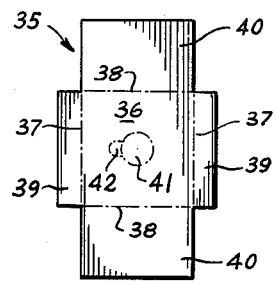
FIG. 2 is a plan view of a blank embodying a preferred form of an insert panel comprising the invention.

A panel insert 35, shown in FIG. 2, is provided with a substantially rectangular bottom wall 36 dimensioned to fit inside the container 20. The bottom 36 is defined by side scores 37 and end scores 38 which respectively define the hinge connection of relatively narrow side flaps 39 and relatively wide flaps 40. The bottom wall 36 is provided with an openable igniting closure 41, which in the embodiment illustrated, is substantially circular in shape.

The igniting closure 41 is defined by a generally circular series of perforations. The igniting opening 41 may also be provided with a thumb receiving tab 42.

Figure 3:
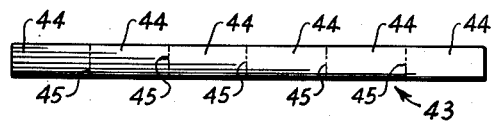
FIG. 3 is a plan view of a blank embodying a flue device comprising a preferred form of the invention.

A flue insert device or igniting element 43, as shown in FIG. 3, may be formed of a series of flue panels 44 which are defined in part by upstanding flue panel scores 45.

Figure 4:
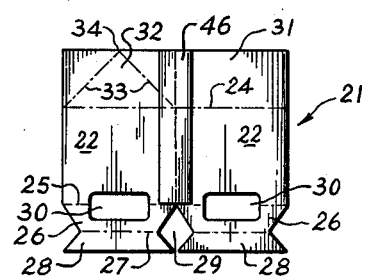
FIG. 4 is a side elevation of a partially erected container blank.
Figure 6:
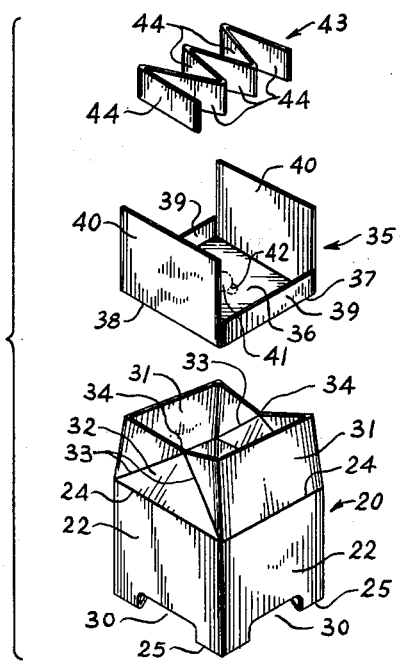
FIG. 6 is an exploded perspective view of an erected container, panel insert and flue insert shown in the proper relative positions prior to assembly.
Figure 5:
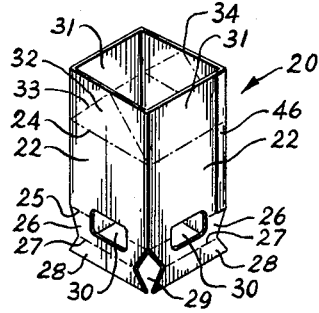
FIG. 5 is a perspective view of the container blank shown in FIG. 4 in a further stage of erection.

The container blank 21 may be erected by folding the endmost side panels 22 inwardly and upwardly about their adjacent corner fold line 23 and taping their abutting edges with a length of tape 46 as shown in FIG. 4. The partially erected container 20 is then erected into a rectangular configuration as shown in FIG. 5. The inner marginal panels 26 and the intermediate panels 28 are then folded inwardly in sequence as set forth in Patent 2,603,401, and the container 20 will then appear as shown in FIG. 6. The panel insert 35 is then erected by folding the side flaps 39 vertically upwardly about their adjacent side scores 37, and by folding the end flaps 40 vertically upwardly about their adjacent end scores 38 as shown in FIG. 6. The flue insert 43 is then erected by folding the flue panels 44 alternately about their adjacent flue scores 45 into a serpentine-like configuration as shown in FIG. 6.

The erected panel insert 35 is then positioned within the container 20 so that its bottom wall 36 is in contacting relation with the upper surface of the intermediate panels 28 forming the recessed bottom of the fuel compartment in the container as shown in view FIG. 8. In this position, the side flaps 39 and the end flap 40 of the panel insert are in upstanding, contacting relation with the inner faces of adjacent portions of the container side panels 22.

The flue insert 43 is then placed inside the previously positioned panel insert and the container may then be charged with charcoal or other fuel. The loaded container will appear as shown in FIG. 8 and it is desirable that the fuel be disposed in random fashion in between the upstanding panels 44 of the flue insert 43.

The top closure means of the container 20 may then be sealed by folding the inner top panels 32 inwardly about their adjacent fold lines 24 so that the outer top panels 31 are automatically moved into overlapping relation thereto. The free marginal edges of the outer top panels may then be sealed by a top sealing tape 47, as shown in FIG. 7. The complete package may now be shipped to the user.

A preferred means of using the invention is to engage the thumb receiving tab 42 lifting it upwardly and outwardly thereby disengaging the igniting closure 41, as best shown in FIG. 10. It will be apparent that portions 48, of the flue insert 43 will be disposed adjacent the opening of the igniting closure 41, as shown in FIG. 9. The top sealing tape 47 is then severed or removed permitting opening of the top closure means defined by the outer top panels 31 and the inner top panels 32. The portions 48 of the flue insert 43 are then ignited as shown in FIG. 12. The package is then placed in the barbecue device, fire chamber, or other device and the process of kindling the fuel will commence.

The ignited flue insert portions 48 will burn comparatively slowly, readily igniting the fuel portions adjacent thereto. Portions of the flue insert 43 adjacent the parts 48 will become automatically ignited and gradually all of the fuel adjacent to the flue insert 43 will be kindled. The heat from the ignited flue insert 43, and from the kindled fuel adjacent thereto will rise upwardly thereby igniting the fuel disposed above the level of the flue insert. The panel insert 35 and the upstanding side walls of the container act to contain the fuel in a compact mass in close contact with the burning flue inserts so as to provide for rapid and effective kindling. As soon as the entire mass of fuel is ignited, the panel insert 35 in the container side panels 22 will then ignite and the entire container 20 and interior parts will be consumed, leaving a uniformly kindled bed of coals.

An adequate supply of air from the atmosphere is assured since the bottom wall 36 of the panel insert 35 is maintained in spaced relation above the base of the container by means of the ledges formed by the intermediate panels 28. The air is free to enter through the air access openings 30 into the igniting closure opening 41. The flue insert 43 has the additional advantage of providing in effect a vertical column into the fuel to assure the even flow of air upwardly to support combustion. In the particular embodiment illustrated the flue insert 43 is slightly less than one-half the height of the interior of the container. This ratio has been found to be satisfactory with charcoal briquets and the like, however, the height of the flue insert 43 may be varied to more readily adapt the container to other particular fuels or to accelerate or retard the speed at which the fuel is kindled.

Also, in the particular embodiment described, it has been found to be desirable to dispose the bottom wall 36 upwardly from the bottom margin of the container a distance substantially equal to one-sixth the entire height of the container 20, however, this ratio may be varied if desired, as long as an adequate supply or air is provided. Further, in the embodiment of the invention described, it will be noted that the fuel is completely sealed during shipment or transit and there is no opportunity for sifting or leakage to occur.

A desirable embodiment of the invention is in a container formed of corrugated paperboard approximately 7 inches square, 6 inches in height, and designed to contain two pounds of compressed charcoal briquets. The size of the package may be varied to provide larger or smaller units as may be desired.

Another embodiment of the invention is shown FIGS. 13–16 in which is provided a similar shaped container 20a which is formed with individual outer top panels 31a and inner top panels of 32a. This modified embodiment is provided with a modified panel insert 35a shown in FIG. 13 which is generally similar to the preferred form of the panel insert 35, with the exception that modified side flaps 39a and end flaps 40a are substantially equal to the height of the side panels 22a of the modified container 20a. In other respects the panel insert 35a is preferably provided with an igniting closure and thumb receiving tab 41a and 42a respectively as shown in FIG. 15.

A modified flue insert 43a as shown in FIG. 13 is provided with two horizontal flue panels 49 which are foldably connected along bottom flue panel cut scores 50 to a pair of upstanding flue panels 51, which in turn are connected together along a top flue panel cut score 52. The modified flue insert 43a is preferably formed of corrugated fibreboard material, with the corrugations disposed so as to provide vertically disposed air spaces within the upstanding flue panels 51 and horizontally disposed air spaces within the horizontal flue panels 49. An air channel 53 will be formed by the folding of the panels 49 and 51 as shown in FIG. 13. The air channel will facilitate the spreading of the fire laterally within the container to accelerate the igniting of the fuel. The modified embodiment of the invention shown in FIG. 13 through FIG. 16 has the advantage of providing a somewhat more rapid ignition of the fuel than the embodiment disclosed in FIG. 1 through FIG. 12.

The modified embodiment shown in FIG. 15 is ignited in substantially the same manner as set forth for the preferred embodiment. The igniting closure opening 41a is formed by removing the material therewithin and the portion 48a of the flue insert 43a exposed by the igniting closure opening 41a is then ignited and the fire will readily spread along the air channel 53, up the upstanding flue panels 51 and horizontally outwardly within the horizontal flue panels 49, thereby igniting the fuel portions are disposed adjacent thereto. The modified side flaps 39a and end flaps 40a which extend substantially the entire height of the container as side wall panels 22a retard the ignition of the exterior container parts until the entire fuel charge is ignited.

As shown in FIG. 17, the lower marginal portion of the container device described is subject to modification falling within the scope of the invention. For example, the triangular ledge portion best illustrated in FIG. 8 and FIG. 15 may be replaced by an upstanding panel member 54 which is provided with a horizontally disposed free marginal top edge 55 adapted to engage the outer or lower face of the bottom wall 36 of the panel insert 35. When this embodiment is employed it has been found to be desirable to employ modified openings 56 extending through the panel member 54 and adjacent registering portions of the container side panels 22 to provide adequate supply of air for combustion. The panel member 54 may be maintained in a vertical upwardly disposed position by any desired means, for example glue or adhesive or the like.

A further embodiment employing the invention is shown in FIGS. 18 and 19, wherein the bottom of the container is formed of a pair of inner closure flaps 57 and outer closure flaps 58. The outer closure flaps 58 may be provided with an igniting closure 41b and thumb receiving tab 42b to provide access for igniting the container. A modified fuel supporting insert 59 having a horizontal fuel supporting panel 60 and downturned side strips 61 which are disposed in flatwise contacting relation with the lower inner faces of the side panels 22b of the container is provided. The side strips rest on the upper surface of the perviously positioned inner closure flaps 57 to maintain the fuel supporting panel 60 in spaced relation with respect to the bottom closure of the container. A secondary igniting opening 62 may be formed in the fuel supporting panel 60 by removing the material from the central portion thereof in a manner similar to the igniting opening 41b. A suitable flue insert, for example as 43b, may be employed. Bottom side openings 63 are provided in the downturned side strips 61 in registering relation with adjacent parts of the container side panels 22b.

The embodiment shown in FIGS. 18 and 19 may be used to ignite the fuel charge contained therein by opening the igniting closure 41b and the secondary igniting opening 62 thereby exposing portions 48b of the flue inserts 43. The flue parts 48b may then be ignited and the flue in the container parts will act to kindle the fuel, in a manner similar to that described for the other embodiments of the invention. The embodiment of the invention shown in FIG. 19 may be further modified by employing additional upstanding inner wall means (not shown) disposed vertically adjacent the container side panels 22b to retard the combustion of the container.

The invention is susceptible with other embodiments, for example, in still further modified forms. All such modifications which are similar or equivalent hereto come equally within the scope of the claims next appearing.

I claim:

1. A flammable siftproof package having a fuel compartment containing a charge of discrete solid particles of fuel, said package having side walls, an openable top, and removable bottom closures and which closures cover openings to maintain the fuel in the fuel compartment, interior wall protecting panels in said compartment fixed in face to face contact with the inner surface of said side walls, a separate substantially completely flammable unitary combination flue and igniting means fabricated from corrugated paperboard, in the fuel compartment and having vertical passages therein, and with a portion thereof in close adjacency with the removable bottom closure, the fuel in the compartment being in contacting relation with substantially all of the exposed surfaces of the flue and igniting means and forming a substantially continuous mass therewith, the package having upstanding side walls having lower marginal portions which are below the said fuel compartment bottom closure, the lower marginal portions providing means for the admittance of air into said package bottom and fuel compartment, whereby when the top and bottom of the package are opened to the atmosphere and the said combination means in the fuel compartment is ignited from the bottom, the fuel in contact with substantially all exposed surfaces thereof is ignited by the products of combustion derived from the burning of the said combination means in the fuel compartment, said interior wall protecting panels therein retarding ignition of the exterior container side walls until the fuel in the compartment is completely ignited.

2. The flammable package as defined in claim 1, wherein the separate unitary combination flue and igniting means is a strip of flammable corrugated paperboard in serpentine-like form in the compartment.

3. The flammable package as defined in claim 1, wherein the separate unitary combination flue and igniting means is a corrugated paperboard in substantially inverted T-shape form.

References Cited in the file of this patent

UNITED STATES PATENTS

| 797,113   | Hiers et al. | Aug. 15, 1905 |
| 1,821,692 | Copeland     | Sept. 1, 1931 |
| 1,959,473 | Heron        | May 22, 1934  |
| 2,666,695 | Brody        | Jan. 19, 1954 |
| 2,743,050 | Crane        | Apr. 24, 1956 |
| 2,834,661 | Chaplin      | May 13, 1958  |

FOREIGN PATENTS

| 10,519  | Great Britain | of 1911      |
| 447,136 | Great Britain | May 5, 1936  |
| 324,525 | Italy         | Feb. 5, 1935 |